Dec. 5, 1967   A. SCHNEIDER ET AL   3,356,719
PREPARATION OF DICARBOXYADAMANTANE COMPOUNDS
Filed April 22, 1965
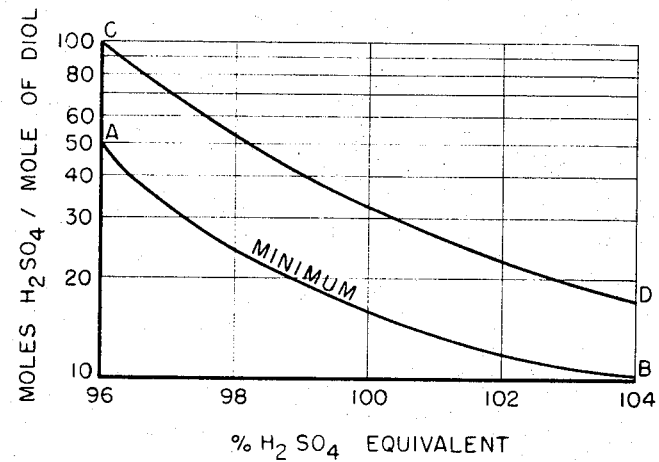
RELATIONSHIP OF
H₂SO₄ : DIOL MOLAR RATIO
TO SULFURIC ACID STRENGTH
INVENTORS
ABRAHAM SCHNEIDER
ROBERT E. MOORE
W.E. McCorquodale, Jr.
ATTORNEY ભ
United States Patent Office 3,356,719
Patented Dec. 5, 1967

3,356,719
PREPARATION OF DICARBOXYADAMANTANE
COMPOUNDS
Abraham Schneider, Overbrook Hills, Pa., and Robert E.
Moore, Wilmington, Del., assignors to Sun Oil Company, Philadelphia, Pa., a corporation of New Jersey
Filed Apr. 22, 1965, Ser. No. 449,981
11 Claims. (Cl. 260—514)

This invention relates to 1,3-dicarboxyadamantanes as new compounds and to their preparation from dihydroxyadamantanes and dihydroxyalkyladamantanes by reaction thereof with formic acid in the presence of strong sulfuric acid.

The carbon nucleus of adamantane (tricyclo-[3.3.1.1$^{3,7}$] decane) contains ten carbon atoms arranged in a completely symmetrical, strainless manner such that four of the carbon atoms occupy bridgehead positions in the rings. The structure of adamantane can be depicted typographically as follows:

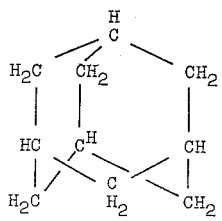

The molecule contains four tertiary hydrogen atoms attached respectively at the bridgehead carbon atoms. All four bridgehead carbons are equivalent to each other and likewise all rings are equivalent.

The 1,3-dicarboxy compounds prepared in accordance with the invention contain an adamantane group consisting of an adamantane nucleus or an alkyladamantane moiety in which either one or two alkyl groups are attached to the adamantane nucleus either at bridgehead or non-bridgehead positions. The total number of carbon atoms in the alkyl substituent group or groups is in the range of 1–10 inclusive. The dicarboxy compounds correspond to the formula

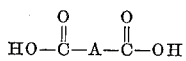

in which A represents the aforesaid adamantane or alkyladamantane group. In these compounds each carboxyl group is attached to a bridgehead carbon of the adamantane nucleus; hence the compounds are all 1,3-derivatives of the adamantane hydrocarbon to which they correspond.

The foregoing class of compounds which can be prepared according to the invention include novel compounds in which the adamantane nucleus has substituents at each bridgehead carbon atom and hence contains no tertiary hydrogen atoms. The substituents at the 1- and 3-positions are the carboxyl groups and those at the 5- and 7-positions are alkyl groups having a total of from 2 to 10 carbon atoms. Such alkyl groups can be methyl, ethyl, propyl, butyl or the like. The compounds of this subclass are 1,3-dicarboxy-5,7-dialkyladamantanes. The preferred compound of this sub-class is 1,3-dicarboxy-5,7-dimethyladamantane.

The compounds of the present invention are prepared from adamantane diols or alkyladamantane diols in which the hydroxy groups originally can be attached to the adamantane nucleus at either bridgehead or non-bridgehead positions or both. These hydroxy compounds are reacted with formic acid in the presence of strong sulfuric acid. Upon mixing the resulting reaction mixture with water the desired dicarboxy compound is formed by a hydrolysis or solvolysis reaction and can be recovered from the mixture. The product is the 1,3-dicarboxyl derivative of adamantane or alkyladamantane even in cases where one or both of the hydroxy groups in the original diol was attached to the nucleus at a non-bridgehead position. This result is obtained due to the fact that the strong sulfuric acid used to effect the conversion also will cause isomerization to a bridgehead position of any hydroxyl group originally attached to a non-bridgehead carbon.

By way of example of the invention, 1,3-dihydroxy-3,5-dimethyladamantane is reacted with anhydrous formic acid in the presence of fuming sulfuric acid (e.g., 102% $H_2SO_4$ equivalent) and the reaction product is then diluted with water. The product is 1,3-dicarboxy-3,5-dimethyladamantane obtained in the form of white crystals. The reactions which occur in forming this product can be illustrated as follows:

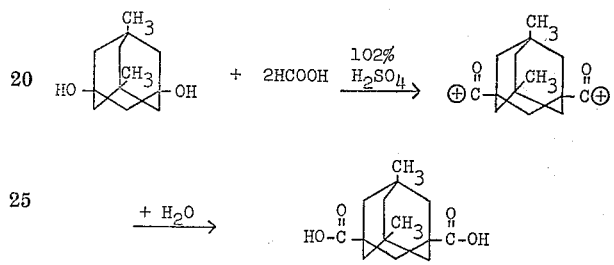

As indicated the formic acid reacts at each site of the hydroxyl groups by what appears to be a carbonium ion mechanism and apparently produces at each site an intermediate

carbonium ion group. In this initial reaction the hydroxyl groups become bound or taken up by the strong sulfuric acid in some manner. In order to obtain the desired product it is essential to dilute the acid solution with a large amount of water in order to allow hydrolysis or solvolysis to proceed to form the two carboxy groups. When the reaction mixture is diluted with sufficient water, the 1,3-dicarboxy-5,7-dimethyladamantane precipitates as white crystals and can be separated by filtration.

The dihydroxy reactant in the present process can be a diol of adamantane itself or of any alkyladamantane having attached to the adamantane nucleus 1–2 alkyl groups containing 1–10 total carbon atoms. The two hydroxy groups can be attached to bridgehead and/or non-bridgehead carbon atoms of the nucleus. Examples of such reactants are the diols of the following hydrocarbons: adamantane; 1-methyl or 2-methyladamantane; 1-ethyl or 2-ethyladamantane; 1,2-dimethyl or 1,3-dimethyladamantane; 1-methyl-3-ethyladamantane; diethyladamantanes; 1-n-propyl or 1-isopropyladamantane; 1-n-butyladamantane; 1,3-di-n-pentyladamantane; 1-methyl-3-heptyladamantane; and 1-n-decyladamantane. Such diols can be prepared by catalytically oxidizing the corresponding adamantane hydrocarbons with air in the manner disclosed in Schneider United States application Ser. No. 395,580, filed Sept. 10, 1964, or by reacting such hydrocarbons with chromic acid in the manner taught in Moore United States application Ser. No. 421,614, filed Dec. 28, 1964.

In effecting the reaction of the dihydroxyadamantane compound with the formic acid it is highly important that the sulfuric acid have a high enough acid strength and be used in large enough amount, as otherwise reaction may not take place or may take place at only one of the hydroxyl sites of the adamantane compound. In other words use of sulfuric acid of insufficient strength or in insufficient amount will result in failure to produce the desired diacid compound and may produce no product or only the monoacid derivative will be obtained. In all cases the strength of the starting acid should be in the range of 96–104% $H_2SO_4$ equivalent by weight, and it is distinctly preferable to employ fuming sulfuric acid having $H_2SO_4$ equivalent in the range of 100–103% by weight. Maximum yields of the desired product can more readily be obtained when fuming sulfuric acid is employed.

The minimum proportion of sulfuric acid to the adamantane diol compound that can be used for the present purpose varies with the strength of the sulfuric acid employed. This is shown in the accompanying drawing in which line AB shows the relationship between the minimum permissible molar ratio of sulfuric acid to diol and the strength of the sulfuric acid. Such ratio is expressed as moles of $H_2SO_4$ equivalent per mole of adamantane diol, while the strength of the acid is expressed as percent $H_2SO_4$ equivalent by weight. Line CD in the drawing indicates the $H_2SO_4$:diol molar ratios above which it is preferable to practice the invention. As indicated by lines AB and CD, fuming sulfuric acid, which is $H_2SO_4$ having sulfur trioxide dissolved therein, is used in strengths ranging up to 104% $H_2SO_4$ equivalent. As can be seen from the drawing, when concentrated sulfuric acid (96%) is used to practice the invention, the moles of $H_2SO_4$ equivalent used per mole of adamantane diol compound should exceed 50:1 (line AB). More preferably this ratio should exceed 100:1 (line CD) to insure the best yield of the desired dicarboxy compound. When the acid strength is 102% $H_2SO_4$, the minimum $H_2SO_4$:diol ratio is about 12:1 (line AB) and preferably such ratio is at least 22:1 (line CD). As indicated in the drawing, still lower $H_2SO_4$:diol ratios are permissible when the acid strength is increased to 104% $H_2SO_4$, although ratios of at least 17:1 are always preferred.

The formic acid reactant preferably is employed in substantially anhydrous form. The amount of the formic acid used should be such that at least one molecule of it is available to react with each hydroxyl group or in other words that the molar ratio of the formic acid to the adamantane diol compound is above 2:1. An excess of formic acid over this ratio is desirable and a ratio of say 5:1 typically can be used. Larger proportions of the formic acid are not detrimental.

In carrying out the present process the adamantane diol compound preferably is first dissolved in the strong sulfuric acid in a proportion such that the molar ratio of $H_2SO_4$ to the diol is at least that required by line AB and preferably is well above such ratio. This can be done merely by adding the diol to the sulfuric acid at room temperature and stirring for several minutes. As the diol goes into solution some release of heat occurs but the exotherm is relatively mild. After the diol has been dissolved, formic acid is added to the mixture while agitating the same and reaction takes place as indicated by the first step of the equation given above. This reaction can be carried out at any temperature between the freezing point of the reaction mixture and say 50° C. when concentrated (96%) sulfuric acid is used but it is generally desirable to maintain the temperature below 30° C. and more preferably below 20° C. When fuming sulfuric acid is employed, the temperature generally should be maintained below 20° C. and preferably in the range 0–10° C. The use of too high a reaction temperature will tend to cause decarboxylation of the desired diacid product.

After the first phase of the overall reaction has been completed, the mixture is admixed with a relatively large volume of water to effect hydrolysis or solvolysis and produce the desired diacid product. Preferably this is done by pouring the strongly acidic mixture over cracked ice to effect dilution while simultaneously preventing the temperature from rising an inordinate amount. Enough water (ice) should be used to adequately decrease the strength of the sulfuric acid so that hydrolysis or solvolysis will occur and the diacid product will precipitate. Generally the strength of the diluted acid should be less than 50% $H_2SO_4$ and more preferably less than 20%. After this final reaction has been effected, the precipitated diacid product can be separated from the mixture by filtration.

The following examples are specific illustrations of the invention:

EXAMPLE 1

This example shows the preparation of 1,3-dicarboxy-5,7-dimethyladamantane using fuming sulfuric acid. To 50 ml. of fuming sulfuric acid having a strength of 102% $H_2SO_4$ equivalent by weight and cooled to about 10° C., 5.0 g. (0.0255 mole) of 1,3-dihydroxy-5,7-dimethyladamantane in powder form were added and the mixture was stirred to dissolve the diol in the fuming acid. Complete dissolution took place in about 5 minutes. The molar ratio of $H_2SO_4$ equivalent to diol was about 38:1. The mixture was maintained at about 10° C. and was stirred while 7.1 g. (0.153 mole) of anhydrous formic acid were added slowly thereto over a period of 30 minutes, following which the mixture was stirred for 45 minutes additionally to insure completion of the reaction. The molar ratio of formic acid to the diol was approximately 6:1. The reaction mixture was then poured slowly over cracked ice (about 0.5 kilogram), whereupon melting of the ice and the resulting dilution of the acid solution caused hydrolysis to take place to form the diacid product in the form of a finely divided precipitate. The mixture was filtered and the residue was washed with benzene to remove any monocarboxylic acid which may have been present due to decarboxylation. The residue then was washed with water, dried and recrystallized from a 50:50 mixture of benzene and acetone. A white crystalline product was obtained in amount of 6.1 g. This product was determined by vapor phase chromatography, infrared and nuclear magnetic resonance analyses to be substantially pure 1,3-dicarboxy-5,7-dimethyladamantane. It had a melting point of 268° C. and the yield thereof was 95% based on theory. With reference to the accompanying drawing, this example shows that the use of an $H_2SO_4$:diol mole ratio of 38:1 for fuming acid having 102% $H_2SO_4$ equivalent (i.e., above line CD) gives an excellent yield of the desired diacid product.

EXAMPLE 2

The diacid compound of Example 1 was again prepared but concentrated sulfuric acid (96% $H_2SO_4$) was used in large proportion instead of fuming acid. Specifically 25 ml. of concentrated sulfuric acid, 0.5 ml. (0.0128 mole) of anhydrous formic acid and 0.28 g. (0.00143 mole) of 1,3-dihydroxy-5,7-dimethyladamantane were mixed at 0° C. and the mixture was allowed to stand until it warmed up to room temperature. In order to insure complete reaction 1.5 ml. (0.0384 mole) of additional formic acid were added dropwise while stirring the mixture and also 5 ml. of additional concentrated sulfuric acid were added. The overall molar ratio of $H_2SO_4$:diol was 362:1 and that of formic acid to diol was 36:1. These are far greater proportions than are necessary for obtaining good results. The mixture then was poured over 100 g. of ice and the resulting diacid product was recovered by filtration. An ether solution of it was water washed and dried with $Na_2SO_4$, and the ether was evaporated. The residue was dissolved in an aqueous 17% NaOH solution and the solution then was acidified with HCl to precipitate the diacid. Finally the precipitated diacid was dissolved in ether, the solution was dried with $Na_2SO_4$ and the ether was evaporated. The resulting product (0.34 g.) had a melting point of 266–270° C. and was identified as substantially pure 1,3-dicarboxy-5,7-dimethyladamantane. The yield was 94.5% based on theory.

EXAMPLE 3

When 96% sulfuric acid was used in generally the same manner as described in Example 2 except that the molar ratio of $H_2SO_4$ to 1,3-dihydroxy-5,7-dimethyladamantane was reduced to 49:1, the product was a mixture of monoacid and diacid and a large proportion of the diol did not undergo reaction.

When adamantane diol or diols of other alkyladamantanes as herein specified are used in place of 1,3-dihydroxy-5,7-dimethyladamantane, similar results are obtained as in the preceding examples.

The diacid adamantane compounds prepared according to the present invention can be polymerized with difunctional compounds such as diamines or dialcohols. Hence the products of the present invention have utility in the manufacture of polyamides or polyesters which can be used in the manufacture of fibers, films and molded articles.

Heretofore in the prior art as disclosed by Stetter and Wulff, Chem. Ber., vol. 93, page 1366 (1960), 1,3-dicarboxyadamantane has been prepared from a mixture of 1,3-dibromoadamantane, silver sulfate and formic acid in the presence of concentrated sulfuric acid. This diacid product, which contains no alkyl groups, has two unsubstituted bridgehead carbon atoms in the adamantane nucleus and hence contains two tertiary hydrogen atoms per molecule. These tertiary hydrogen positions are relatively reactive sites. In contrast the 1,3-dicarboxy-5,7-dialkyladamantanes of the present invention have no unsubstituted bridgehead carbon atoms and hence no tertiary hydrogen atoms. This is advantageous for utilizing such diacid products to make polymers, since the polymers made from 1,3-dicarboxy-5,7-dialkyladamantanes are more stable than the corresponding polymers would be if the two alkyl groups were not present in the monomer. In other words the presence of alkyl groups at the 5- and 7-positions of the adamantane nucleus results in higher stability with respect to oxidation resistance, thermal degradation and the like.

The present method of making 1,3-dicarboxyadamantane compounds is distinctly advantageous over the method of making 1,3-dicarboxyadamantane as disclosed in the aforesaid reference in that the present method does not require the use of an expensive silver salt as the former method does. It is further advantageous in that higher yields of the diacid product can readily be obtained. For example, a yield of 80% of the theoretical was obtained according to the aforesaid prior art reference whereas the present method will readily give yields of the order of 95% on theory, especially when fuming sulfuric acid is used to effect the reaction.

We claim:

1. Method of preparing a 1,3-dicarboxyadamantane which comprises dissolving a dihydroxyadamantane compound, selected from the group consisting of dihydroxyadamantane and dihydroxyalkyladamantanes having attached to the adamantane nucleus 1-2 alkyl groups containing 1-10 total carbon atoms, in sulfuric acid having a strength corresponding to 96-104% $H_2SO_4$ equivalent by weight, the molar ratio of $H_2SO_4$ to said dihydroxyadamantane compound being above that shown by line AB of the accompanying drawing, reacting the mixture at a temperature below 50° C. with formic acid in amount of at least two moles of formic acid per mole of said dihydroxyadamantane compound, mixing the reaction mixture with water and separating said 1,3-dicarboxyadamantane compound from the resulting mixture.

2. Method according to claim 1 wherein the sulfuric acid is fuming sulfuric acid.

3. Method according to claim 2 wherein the strength of the fuming sulfuric acid is in the range of 100–103% $H_2SO_4$ equivalent and the reaction temperature is maintained below 20° C. during the reaction of the formic acid.

4. Method according to claim 3 wherein said temperature is maintained below 10° C.

5. Method according to claim 1 wherein said dihydroxyadamantane compound is a 1,3-dihydroxy-5,7-dialkyladamantane.

6. Method according to claim 1 wherein said ratio of $H_2SO_4$ to dihydroxyadamantane compound is above that shown by line CD of the accompanying drawing.

7. Method of preparing 1,3-dicarboxy-5,7-dimethyladamantane which comprises dissolving 1,3-dihydroxy-5,7-dimethyladamantane in fuming sulfuric acid having a strength corresponding to 100–103% $H_2SO_4$ equivalent by weight, the molar ratio of $H_2SO_4$ to said dihydroxydimethyladamantane being above that shown by line AB of the accompanying drawing, reacting the mixture at a temperature below 20° C. with formic acid in amount of at least 2 moles per mole of dihydroxydimethyladamantane, mixing the reaction mixture with water and separating 1,3-dicarboxy-5,7-dimethyladamantane from the resulting mixture.

8. Method according to claim 7 wherein said ratio of $H_2SO_4$ to said dihydroxydimethyladamantane is above that shown by line CD of the accompanying drawing.

9. Method according to claim 8 wherein said temperature is maintained in the range of 0–10° C.

10. Method according to claim 1 wherein at least one of the hydroxy groups in said dihydroxyadamantane compound is located at a non-bridgehead position.

11. Method according to claim 1 wherein both hydroxy groups in said dihydroxyadamantane compound are located at non-bridgehead positions.

References Cited

UNITED STATES PATENTS 3,250,805   5/1966   Lamola _____ 260—468 X

OTHER REFERENCES

Koch et al., Angewandte Chemie, vol. 72, p. 628 (1960).

Fort et al., Chem. Rev., vol. 64, pp. 287–290 (1964).

Koch et al., Liebig's Annalen Der Chemie, vol. 618 (1958) pp. 251–266.

LORRAINE A. WEINBERGER, *Primary Examiner.*

R. K. JACKSON, *Examiner.*

P. J. KILLOS, *Assistant Examiner.*